Dec. 26, 1950 B. B. MINNIUM 2,535,367
VARIABLE CONDENSER
Filed Dec. 21, 1945 3 Sheets-Sheet 1
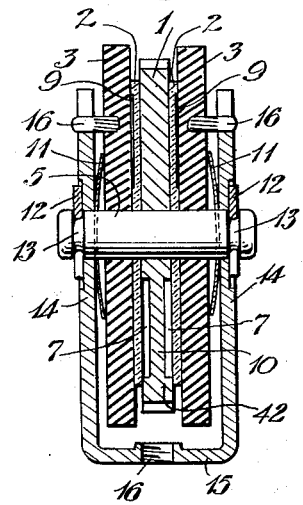
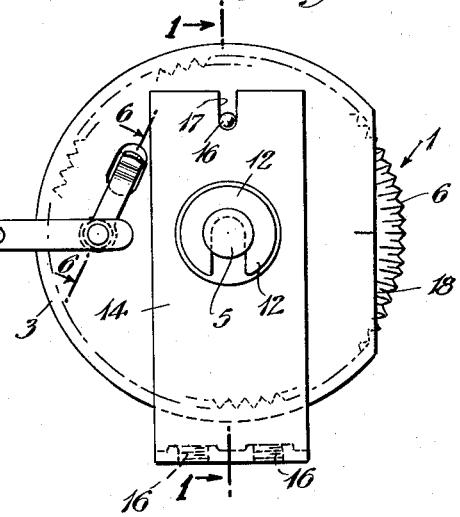
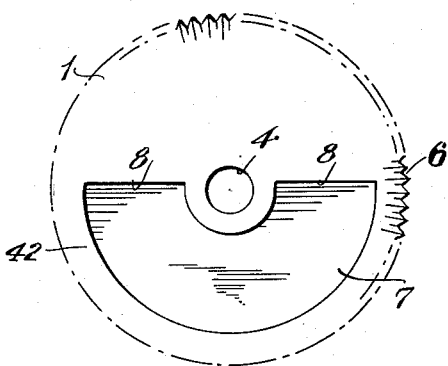
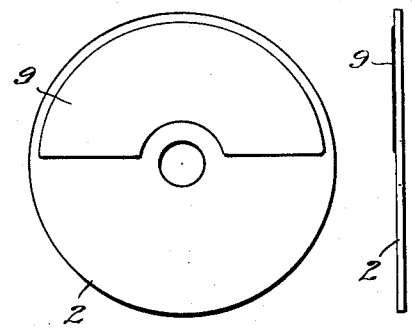
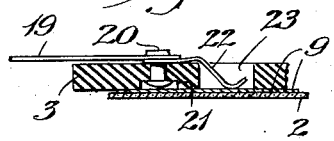
INVENTOR
BYRON B. MINNIUM
BY
Pennie, Edmonds, Morton & Barrows
HIS ATTORNEYS Dec. 26, 1950   B. B. MINNIUM   2,535,367
VARIABLE CONDENSER
Filed Dec. 21, 1945   3 Sheets-Sheet 2
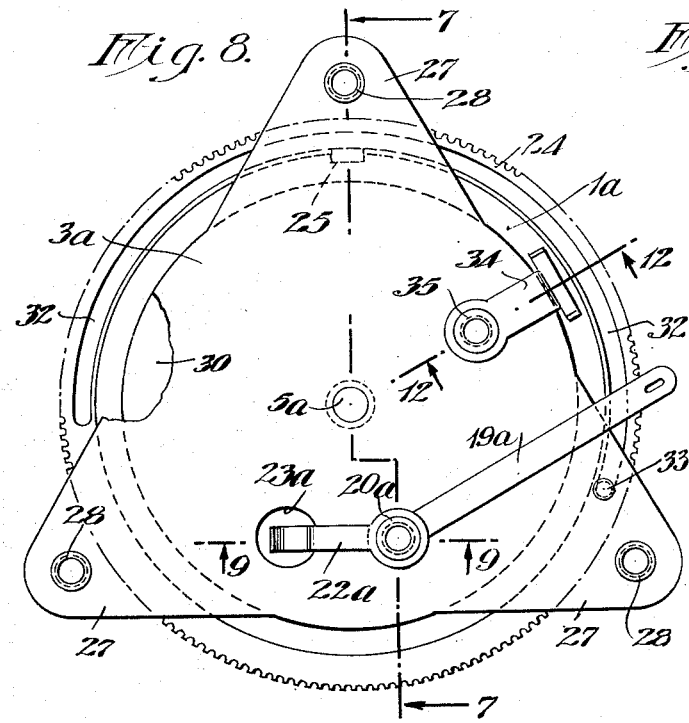
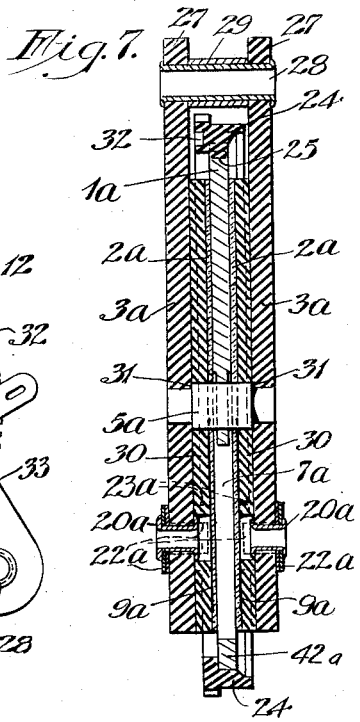
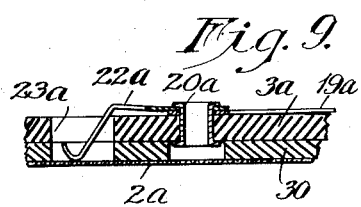
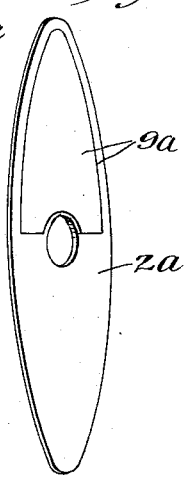
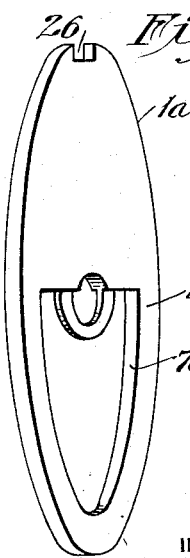
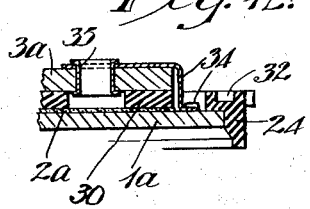
INVENTOR
BYRON B. MINNIUM
BY Pennie, Edmonds, Morton and Barrows
HIS ATTORNEYS

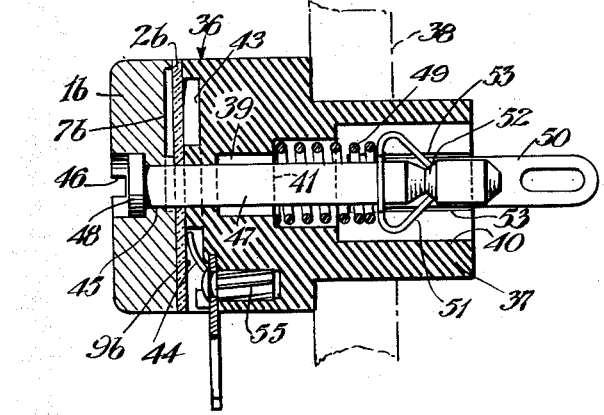
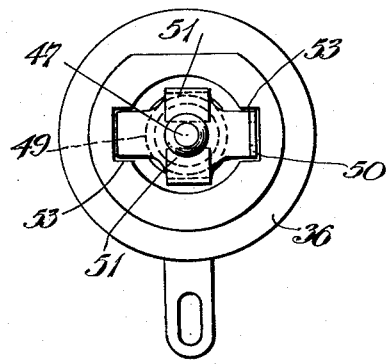
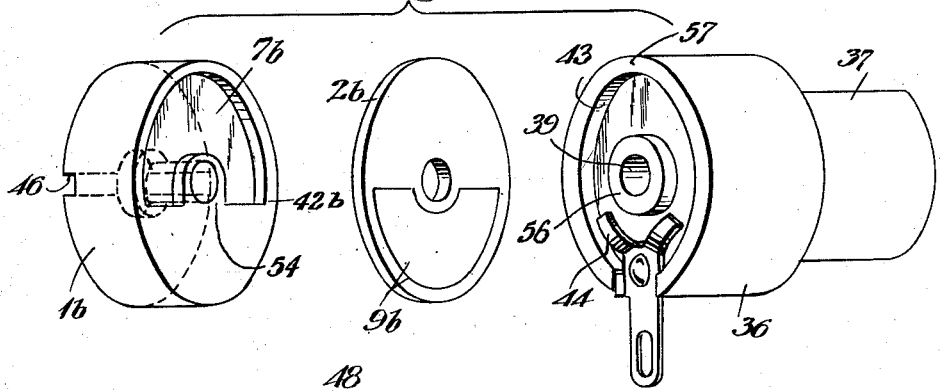
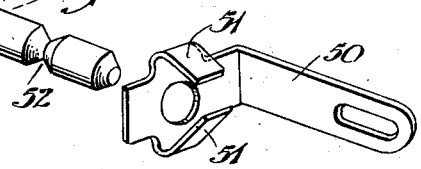
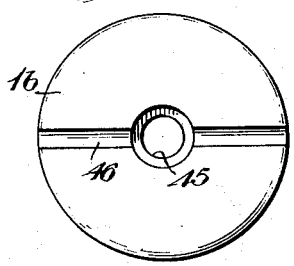
INVENTOR
BYRON B. MINNIUM Patented Dec. 26, 1950

2,535,367

UNITED STATES PATENT OFFICE 2,535,367

VARIABLE CONDENSER

Byron B. Minnium, Erie, Pa., assignor to Erie Resistor Corporation, Erie, Pa., a corporation of Pennsylvania Application December 21, 1945, Serial No. 636,455

14 Claims. (Cl. 175—41.5)

This invention relates to electrostatic condensers of the type which are continuously variable, that is to say, variable in infinitely small increments.

The prime object of the invention is to provide an improved variable condenser of a compact nature, or, in other words, which will provide maximum capacity in a minimum amount of space.

Another object of the invention is to provide a variable condenser which is convenient to adjust and smooth in operation.

The invention will be understood from a consideration of the accompanying drawings which, by way of example, illustrate several embodiments thereof, and from the following description. In these drawings:

Fig. 1 is a view in vertical section of a tuning condenser, the section being taken on the plane 1—1 of Fig. 2;

Fig. 2 is a view of the condenser in side elevation;

Fig. 3 is a side view of the condenser rotor;

Figs. 4 and 5 are, respectively, a front view and a side view of a stator element;

Fig. 6 is a sectional detail taken on the plane 6—6 of Fig. 2;

Fig. 7 is a view in vertical section of a modified form of tuning condenser taken on the plane indicated by the broken line 7—7 in Fig. 8;

Fig. 8 is a side view of this condenser;

Fig. 9 is a detail section taken on the plane 9—9 of Fig. 8;

Fig. 10 is a perspective view of one of the stator elements;

Fig. 11 is a similar view of the rotor element with its operating rim removed;

Fig. 12 is a detail section taken on the plane 12—12 of Fig. 8;

Fig. 13 is a view in vertical section of a further modification in the form of a trimmer condenser;

Fig. 14 is a rear view looking from the right hand of Fig. 13;

Fig. 15 is a perspective view showing the three principal members of this condenser separated from one another;

Fig. 16 is a perspective view showing the parts which hold together the members shown in Fig. 15; and Fig. 17 is a front view of the condenser rotor looking from the left in Fig. 15.

Referring now to these drawings, and first to Figs. 1 to 6 inclusive, the improved condenser comprises a rotor element 1 which is positioned between two similar stator elements 2 of ceramic or other suitable material having good dielectric properties, secured, respectively, to two backing plates 3 of insulating material. Rotor element 1 is a circular metallic disk having a central aperture 4 through which a supporting shaft 5 passes, this shaft also passing through similar apertures in the two stator elements 2 and backing plates 3. Rotor 1 is provided with knurling 6 to facilitate turning it to adjust the condenser capacity.

The disk comprising rotor 1 has two similar faces which are both flat, parallel and smooth throughout, except for two sector-shaped holes, recesses or cut-away portions or depressions 7, which, in the embodiment illustrated, are positioned in registry with one another in the opposite faces of the disk. These sector-shaped cut-away portions or depressions 7 have an angular extent of slightly more than 180° as shown in Fig. 3, being terminated by straight lines 8, 8 which are parts of chords and thus parallel with a diameter of the disk. It will be understood that the term "cut-away portion" as here, or hereafter, used in this specification does not imply that material is removed by means of a cutting tool, as the cut-away portions may be formed by utilizing any suitable manufacturing process.

The stator elements 2 each comprise a circular disk of ceramic or other suitable dielectric material of extreme thinness, being in the neighborhood of only .015 inch in thickness. Being so thin the dielectric disks 2 are also very brittle and require only a feeble bending force to fracture them. The backing plates 3 supply the stiffness and rigidity necessary to protect disks 2. The opposite faces of these disks are ground and lapped to a smooth finish which is substantially flat. One face of each disk is then provided with a metallic layer 9. Layer 9 may be applied as a metallic film by electro-deposition or otherwise, and these two layers form the stator condenser plates of the device. They are sector-shaped as shown in Fig. 4 and have an angular extent which is somewhat less than 180°. The thickness of the stator disks is considerably exaggerated for the sake of clearness in both Figs. 1 and 5 and also in other figures of the drawings.

The device is assembled with the two dielectric (hereinafter referred to as ceramic) disks 2 arranged with their metallic layers or conductive condenser plates 9 on the outside and with the metallic rotor 1 between the disks. Electrically, the rotor 1 forms a common movable condenser plate for the two stator condenser plates 9, these two plates being separated from the rotor condenser plate by the thickness of the ceramic disks 2, which, as stated, are of extreme thinness.

The maximum condenser capacity is obtained by turning rotor 1 to the position shown in Figs. 1 and 3, so that the opposite surfaces of the rotor are in as close proximity as possible to the stator condenser plates 9, namely, so that the proximate surfaces can cooperate electrostatically. Minimum capacity of the condenser is produced by turning the rotor 180° so as to bring the two holes or depressions 7 opposite stator condenser plates 9. Rotor 1 is of sufficient thickness so that the bottoms of depressions 7 will thereby be spaced or separated from stator condenser plates 9 a sufficient amount to produce the desired decrease in electrostatic capacity and at the same time leave a metallic central web portion 10 between the two depressions. Intermediate positions of the rotor give a continuous variation in capacity between the maximum and minimum.

It is important, in order to obtain the highest possible maximum capacity, to maintain intimate contact between the surfaces of rotor 1 and stator elements 2 so as to eliminate the possibility of air spaces between them; in other words, the ceramic disks 2 should be pressed firmly against the opposite faces of the rotor. It is also important to press these parts together with a pressure which is uniform over their entire contacting areas which includes the rim portion 42 around the periphery of rotor element 1. For this purpose the thin ceramic disks 2 are reinforced by the backing plates 3 which are of sufficient thickness to be substantially rigid and the two backing plates are urged toward one another by means of two dished spring washers 11 which may be fixed in position on shaft 5 in any suitable manner. When the ceramic disks are thus reinforced and supported they are prevented from bending, i. e., the bending can be measured only in millionths of an inch.

This is accomplished by means of two slotted washers 12 which are held in grooves 13, one adjacent each end of the shaft 5, spacers 14 being interposed between washers 12 and springs 11 (Figs. 1 and 2). In the form of the invention illustrated spacers 14 comprise two parallel arms of a U-shaped supporting bracket 15, the base of which is provided with threaded apertures 16 for mounting and connection purposes.

In order to maintain the two stator condensers 9 in registry or alignment with one another the ceramic disks 2 are secured to their respective backing plates 3 in any suitable manner, as, for example, by means of cement; also backing plates 3 in turn are prevented from rotation on shaft 5 by means of two pins 15 preferably in the form of self-tapping drive screws which are fixed in apertures in the respective backing plates 3 and project into slots 17, one in each end of the parallel arms of bracket 15. Backing plates 3, as shown in Fig. 2, are circular disks somewhat larger in diameter than rotor 1 and slabbed at one side as indicated at 18 in order to expose the knurling 6 of the rotor, and also to expose calibration or scale markings (Fig. 2) which may be placed on either or both faces of the rotor.

If desired the recesses or depressions 7 may be angularly displaced 180° from each other in the surface of rotor 1, condenser plates 9 being staggered 180° from each other to correspond. This arrangement has at least two advantages. With the rotor construction as shown in Fig. 1 web portion 10 between the two recesses 7 must have a certain minimum thickness in order that rotor 1 may be manufactured by a desirable method such as die casting. To obtain the desired dimension here the overall thickness of the rotor might be too great. Staggering the rotor depressions and stator condenser plates eliminates this difficulty. The second advantage is that the rotor is inherently stronger.

Each of the stator condenser plates 9 has a connection terminal 19, one of which is shown in Figs. 2 and 6. This consists of a metal strip apertured at its inner end and fixed to the adjacent backing plate 3 by means of a rivet 20, the head of which is received in a recess 21 on the inner face of the backing plate so as to avoid any localized pressure against the ceramic disk 2 holding the condenser plate. Connection is made with this metallic film 9 by means of a spring clip 22, also held in place by rivet 20, and the inner end of which extends through an elongated aperture 23 in backing plate 3 and bears against the metallic film. The connection terminal for the rotor 1 is shown only as a threaded hole 16, as such connection can be made in any convenient manner to the supporting bracket 15.

The modified form of tuning condenser shown in Figs. 7 to 12 inclusive, differs from the form previously described in several particulars, which will appear as the description proceeds. The metallic rotor 1a is provided with an encircling ring 24 preferably of insulating material which may be knurled, or toothed for the engagement of an adjusting pinion. The cylindrical surface of the ring (Fig. 7) may also bear calibration or scale markings or divisions (not shown). Rotor 1a forms a common movable condenser plate with the two stator condenser plates 9a, formed, as before, of metallic layers or films on the outer surfaces of two ceramic stator disks 2a.

Ring 24 may be made of any suitable insulating material and pressed onto the periphery of rotor 1a, the two preferably being inter-connected by means of a tongue 25 fitting into a recess 26 in the edge of the rotor. The metal part of rotor 1a differs from rotor 1 in that the hole, recess or cut-away portion is in the form of an aperture or perforation 7a extending through the disk from face to face. Rim portion 42a extends around the entire periphery of the rotor including the periphery of perforation 7a and functions in the same way as rim portion 42 of the device of Figures 1–3, namely, to assist in preserving uniform pressure over the entire contacting areas of stator 2a and rotor 1a at all positions of adjustment.

In this modification the supporting bracket 15 (Fig. 1) is omitted and the two backing plates 3a are each provided with three extensions or ears 27 so that these backing plates have a triangular appearance. Ears 27 constitute means by which the two backing plates are secured together in fixed spaced position to constitute the framework of the device. Each pair of ears 27 is fastened together by means of a hollow rivet 28 and a spacing sleeve 29. The condenser may be mounted by means of screws passing through one or more of the hollow rivets 28.

In order to support and hold the ceramic disks 2a forming the stator firmly pressed against the opposite surfaces of rotor 1a, pressure pads or cushions 30 of flexible resilient material such, for example, as the synthetic rubber known as "neoprene" are provided between the stator disks 2a and the backing plates 3a. Pads 30 may be cemented to the backing plates and the ceramic disks 2a in turn cemented to pads 30.

Rotor 1a turns on a shaft 5a which is supported at its ends in apertures in backing plates 3a, and is shouldered near each end as indicated at 31 to maintain the spacing of the backing plates and prevent uneven distribution of pressure on ceramic disks 2a by the resilient pads 30. In order to limit the rotation of rotor 1a in both directions an arcuate slot 32 is formed in one side of rotor ring 24 and a single stop pin 33 which projects into this slot is mounted on the inner face of one of the backing plates 3a. The engagement of the ends of this slot with pin 33 limits the rotation of the rotor.

Each of the stator condenser plates 9a is provided with a separate contact terminal, one of these terminals being shown in Figs. 8 and 9. The construction is similar to that shown and described in connection with Figs. 2 and 6 and consists of a terminal strip 19a and contact spring 22a which are held in position by means of a rivet 20a. Spring 22a makes contact with the metal film comprising condenser plate 9a through an aperture 23a which, in this case, extends through both backing plate 3a and resilient pad 30.

In this form of the tuning condenser it is necessary to provide a connection terminal for rotor 1a. This consists of a contact spring 34 which is secured to one of the backing plates 3a by means of a rivet 35, the end of the contact spring extending around the outer edge of the backing plate and making wiping engagement with the surface of the rotor. Connection can be made directly to contact spring 34, or, if desired, a terminal strip similar to strip 19a may be placed under the head of rivet 35.

It will be understood in connection with both forms of tuning condenser described above, that is, the condenser of Figs. 1 and 2 and the condenser of Figs. 7 and 8, that their stator condenser plates may be connected in parallel to form a single condenser, or that the two stator condenser plates may be individually connected to tune separate circuits. In the latter case there may be conditions where it is desired to eliminate capacity coupling between the stator condenser plates when the rotor of the condenser is adjusted to minimum capacity. In that event a rotor element 1 as shown in Figs. 1 and 3 having a metallic web portion 10 separating the two sector-shaped holes or depressions 7 is preferable to the form of rotor 1a shown in Figs. 7 and 11 in which the sector-shaped hole 7a extends through the rotor from face to face. It will be understood, however, that either form of rotor may be used with either of these two types of condensers.

It will also be understood that if desired, in the interest of obtaining uniform pressure distribution over the outside surfaces of the ceramic plates of any of the figures. For example, referring to Figs. 1-6, inclusive, resilient pressure pads similar to pad 30 may be placed between the ceramic disks 2 and backing plates 3, shaft 5 being lengthened accordingly and bracket 15 widened somewhat.

Another modified form of condenser is illustrated in Figs. 13 to 17 inclusive, this form being intended for use where it is desired to make a comparatively small adjustment (often a permanent adjustment) of the capacity of a circuit. Condensers of this type are frequently known as "trimmer" condensers. In this modification there is only a single stator element comprising the ceramic disk 2b, the thickness of which has been shown greatly magnified for the sake of clearness. Actually it may be as thin as disk 2 of Fig. 1. This disk has a single, sector-shaped condenser plate 9b on one face in the form of a metallic film as before.

As a backing member this condenser has a body 36 which has a reduced and shouldered rear portion 37 to facilitate its support in a panel 38 or other part of the apparatus. Body 36 in order to accommodate the parts which hold the device together, has a central aperture 39 with an enlarged recess 40 at its rear end, and, inwardly from the bottom of recess 40, a shoulder 41. In the front face of body portion 36 there is an annular recess 43 to receive a combined contact spring and connection terminal 44 for the stator condenser plate 9b. This is held in place by means of a self tapping drive screw 55 with the end of terminal member 44 projecting outwardly from body 36 for convenience in making the connection. As a result of forming the recesses 39 and 43, pressure areas, here on raised portions 56 and 57, are formed on the backing member 36. As before, these pressure areas have coplanar surfaces. Central area 56 completely surrounds the aperture 39 and peripheral rim area 57 extends almost completely around the periphery of the backing member. These two areas are symmetrical radially and angularly with respect to the center aperture 39 and they oppose corresponding areas 54 and 42b on the face of the rotor element 1b. Thus, as can be seen from Fig. 15, the thin disk 2b is compressed between two rigid members with force equally and symmetrically distributed over substantially the entire area of the disk.

The rotor comprises a comparatively thick and rigid metal disk 1b having a central aperture 45 (Figs. 13 and 17) and a cross slot 46 for the insertion of a screw driver or other adjusting tool. Its inner surface is provided with a sector-shaped cut-away portion or recess 7b. Like rotors 1 and 1a, the rotor 1b has a rim 42b extending entirely around its periphery including the sector shaped recess 7b. Also, it has a continuous central area 54 around the hole 45, the surface of the rim and central areas being coplanar.

Ceramic disk 2b is cemented to the left-hand face of body portion 36 with its sector-shaped metallized surface 9b in contact with the two prongs of contact spring 44. While the cement is still wet rotor 1b is placed over ceramic disk 2b with its flat smooth surface in engagement with the outer lapped surface of the ceramic disk, and a central rivet or small pin 47 having a head 48 at its left-hand end is inserted through aperture 45 in the rotor and aperture 39 in the body member 36. The unit is then turned over and a helical spring 49 is dropped over pin 47. The assembly is then completed by pushing a rotor terminal member 50 over the right-hand end of pin 47.

Terminal member 50 is an L-shaped member as shown in Fig. 16, having two outwardly bent spring ears 51, and as the member is slipped over the end of pin 47 these ears spring into a circular recess 52 near the end of pin 47 and lock the parts together. In order to hold the outer part of connection terminal 50 in a definite position with respect to the body 36, the portion of the terminal from which ears 51 project is received in rectangular pockets 53 shown in Fig. 14, which prevent terminal member 50 from turning.

To give an indication of the very small size of these devices it may be stated that Figs. 13 and 14 are approximately four times actual size, the diameter of rotor disk 1b being 3/8 of an inch. The tuning condensers shown in Figs. 1 to 12 inclusive, are approximately 1½ inches in diameter so that these figures are about double size.

It will be understood that the opposite faces of the rotor elements 1 and 1a, and the inner face of rotor 1b are lapped to an extremely smooth finish and also that the faces of the ceramic disks 2, 2a and 2b are similarly finished. This aids in bringing the condenser plates into close proximity, and minimizing the air film between them resulting in high and stable electrostatic capacity, and also gives smooth operation since the engaging surfaces move in gliding contact with one another.

The condenser construction of the present invention affords a high capacity for a given size of the device and in spite of their small size these devices are rugged and reliable.

It will be understood that the invention is not limited to the particular condensers illustrated in the accompanying drawings, but that the scope of the invention is set forth in the appended claims and that changes may be made without departing from the spirit of the invention or exceeding the scope as set forth in these claims.

I claim:

1. In a variable condenser, a stator element comprising a dielectric disk having one face finished flat and a conductive plate disposed on the opposite face thereof, a rigid rotor element having on a surface thereof a flat conductive portion comprising a rotor electrode, said surface of said rotor element being disposed in frictional contact with said finished face of said stator element and rotatable with respect thereto, so that said rotor electrode electrostatically cooperates with the conductive plate of said stator element, said disk being of brittle material and so thin as to be subject to fracture if bent, a substantially rigid insulating backing member for said disk, and pressure means cooperating with said backing member for urging said rotor element and disk toward each other, the surface of said rotor element having an effectively continuous circular frictional engagement with at least the central portion and the periphery of said disk, whereby pressure is applied uniformly from said rotor element and from said backing member to said disk at all positions of adjustment of said rotor element.

2. In a variable condenser, a dielectric disk having one face finished flat and a conductive condenser plate of substantially sector shape disposed on the opposite face thereof, said disk having a central aperture, a rotor element of conductive material in contact with the finished face of said disk comprising a substantially rigid apertured disk-like member having a face a portion of which is cut away so as to form respectively electrostatically cooperating and relatively non-cooperating areas on said rotor element, said cooperating area serving to cooperate electrostatically with said condenser plate, said disk being of brittle material and so thin as to be subject to fracture if bent, a rigid insulating body member forming a backing support for the dielectric disk, a circular pressure area around the center of said body member and a concentric circular area substantially around the periphery of said body member, the surfaces of said areas being in the same plane and comprising with said backing member a backing support for the dielectric disk, said body member having a central aperture therethrough terminating in a recess at the rear of said body member, a shoulder within said recess, a metal pin having on one end means engaging said rotor element and electrically contacting the same, said pin extending through the apertures in said disk, said rotor element and said body member, a coil spring within said recess and having its inner end bearing against said shoulder, said spring being secured on said pin and urging said rotor element and said body member toward each other, and rotor terminal means contacting said pin and anchored to said body member against rotation with said pin.

3. In a variable condenser of the solid dielectric type, the combination which comprises, a rigid rotor element having on a surface thereof a flat conductive portion comprising a rotor electrode, a stator element comprising a disk of thin, brittle insulating material subject to fracture if bent and having two parallel faces, a conductive portion affixed to a first face of said stator element such that the entire first face of said stator element including said conductive portion is flat, said last-named conductive portion comprising a fixed electrode adapted to cooperate electrostatically with said rotor electrode, the surface of said rotor element having continuous circular areas at the center and periphery thereof in effective frictional engagement with the second face of said disk, a rigid backing member of insulating material, pressure areas on said backing member opposing said circular peripheral areas of said rotor element said backing member, said rotor element and said disk having holes therethrough, said holes being in alignment, a conductive shaft extending through said holes, said shaft having a head on one end, said head and shaft being in electric connection with the conductive portion of said rotor element, a spring contact terminal secured to said backing member and being disposed in electric connection with said conductive portion of said stator element, resilient means coacting with said backing member and said shaft maintaining said shaft under tension so as to urge said rotor against said second face of said stator and said first face of said stator against said pressure areas on said backing member, and terminal means in electric connection with said shaft.

4. In a variable condenser of the solid dielectric type, the combination which comprises, a circular rotor element of rigid material having on a surface thereof a flat conductive portion comprising a rotor electrode, a stator element comprising a disk of thin, brittle insulating material subject to fracture if bent and having two parallel faces, a conductive portion of shape corresponding to that of said rotor element affixed to a first face of said stator element such that the entire first face including said conductive portion is flat, said last-named conductive portion comprising a fixed electrode adapted to cooperate electrostatically with said rotor electrode, said disk being disposed with the second face thereof adjacent and in frictional contact with the surface of said rotor element over a continuous circular area comprising at least a peripheral rim around said second face of said disk, a rigid backing member of insulating material, said backing member, said rotor element and said disk having holes through the center thereof, said holes being in alignment, a circular area surrounding the hole in said backing member disposed in contact with said disk and serving to rigidly support said disk against bending, a conductive shaft extending through said holes, said shaft having a head on one end, an electric connection between said head and the conducting portion of said rotor element, a spring contact terminal secured to said backing member and being disposed in electric connection with said conductive portion of said stator element, resilient means coacting with said backing member and said shaft maintaining said shaft under tension so as to urge said rotor against said stator and said stator against said backing member, and terminal means in electric connection with said shaft.

5. In a variable condenser of the solid dielectric type, the combination which comprises, a circular rotor element of rigid material having on a surface thereof a flat conductive portion comprising a rotor electrode, a stator element comprising a disk of thin, brittle insulating material subject to fracture if bent and having two parallel faces, a conductive portion corresponding to that of said rotor element affixed to a first face of said stator element such that the entire first face including said conductive portion is flat, said last-named conductive portion comprising a fixed electrode adapted to cooperate electrostatically with said rotor electrode, said disk being disposed with the second face thereof adjacent and in frictional contact with the surface of said rotor element over a continuous circular portion comprising at least a peripheral rim around said second face of said disk, a rigid backing member of insulating material, said backing member having a hole therethrough, said rotor element having a hole through the center thereof and said disk having a corresponding hole therethrough, said holes being in alignment, a conductive shaft extending through said holes, said shaft having a head on one end, an electric connection between said head and the conducting portion of said rotor element, said shaft being disposed to rotate with said rotor, a circular groove around said shaft spaced from said head, a spring contact terminal secured to said backing member and being disposed in electric connection with said conductive portion of said stator element, resilient means coacting with said backing member and said shaft maintaining said shaft under tension so as to urge said rotor against said stator and said stator against said backing member, and terminal means in electric connection with said shaft, said terminal means being anchored to said backing member against rotation and including resilient means engaging said shaft within said groove.

6. In a variable condenser of the solid dielectric type, the combination which includes, a stator element comprising a disk of dielectric material having two parallel faces and being so thin as to be subject to damage if bent, a conductive segment secured to a first face of said disk, said first face being finished such that the entire surface thereof including said segment is substantially flat, the second face of said disk comprising said dielectric material and being finished flat, a rigid rotor element having on a face thereof a flat conductive segment, said segments being disposed to cooperate electrostatically with each other to an adjustable extent, the face of said rotor element including at least a continuous uniplanar central area around the center thereof and a continuous uniplanar peripheral area around the periphery thereof, the surfaces of said areas being in the same plane and comprising a symmetrical rigid reinforcing support for said disk at all positions of said rotor, a rigid backing member, pressure areas on said backing member parallel to the faces of said disk, disposed in contact with said first face of said disk, and shaped and positioned to oppose said areas of said rotor element, a shaft on which said rotor element rotates, said shaft extending through centers of said rotor element and of said disk and into said backing member, and resilient means cooperating with said shaft and said backing member urging said pressure areas and the areas on said rotor element toward each other so that said disk is rigidly supported therebetween and thereby is prevented from bending at all adjusted positions of said rotor element.

7. In a variable condenser of the solid dielectric type, the combination which includes, a stator element comprising a disk of dielectric material having two parallel faces and being so thin as to be subject to damage if bent, a conductive segment secured to a first face of said disk, said first face being finished such that the entire surface thereof including said segment is substantially flat, the second face of said disk comprising said dielectric material and being finished flat, a rigid rotor element having on a face thereof a flat conductive segment, said segments being disposed to cooperate electrostatically with each other to an adjustable extent, the face of said rotor element including at least a continuous central area around the center thereof, the surface of said area comprising a symmetrical rigid reinforcing support for said disk at all positions of said rotor, a rigid backing member, a pressure area on said backing member parallel to the faces of said disk, disposed in contact with the first face of said disk, and shaped and positioned to oppose said area of said rotor element, a shaft on which said rotor element rotates, said shaft extending through centers of said rotor element and of said disk and into said backing member, and resilient means cooperating with said shaft and said backing member urging said pressure area and said area on said rotor element toward each other so that said disk is rigidly supported therebetween and thereby is prevented from bending at all adjusted positions of said rotor element.

8. A variable condenser according to claim 1, which includes a layer of flexible compressible material interposed between said backing member and said stator element.

9. A variable condenser according to claim 1, which includes a flat sheet of rubber-like material interposed between said backing member and said stator element.

10. A variable condenser according to claim 1, which includes a layer of compressible material having substantially parallel opposed surfaces interposed between said backing member and said stator element, the areas of the surfaces of said layer corresponding to and being at least coextensive with the areas of said central portion and periphery of said disk.

11. A variable condenser according to claim 3 in which the pressure areas on said backing member include at least a portion of the surface of a pressure pad of flexible, compressible material interposed between said backing member and said disk, said pad having holes therethrough, through which said shaft and said spring contact terminal pass.

12. A variable condenser according to claim 3 in which said pressure areas on said backing member are the surfaces of resilient material.

13. A variable condenser according to claim 7 in which said pressure area on said backing member is the surface of resilient material.

14. A variable condenser according to claim 7 in which said pressure area on said backing member comprises an area on a flat pad of resilient insulating material, at least one of the surfaces of said pad being affixed to the adjacent surface with which it is in contact.

BYRON B. MINNIUM.

REFERENCES CITED

The following references are of record in the file of this patent:

UNITED STATES PATENTS

| Number | Name | Date |
| --- | --- | --- |
| 1,534,213 | Hill | Apr. 21, 1925 |
| 1,620,020 | Hardy | Mar. 8, 1927 |
| 2,109,266 | Franklin | Feb. 22, 1938 |
| 2,179,068 | Sprague | Nov. 7, 1939 |
| 2,370,722 | Ehlers | Mar. 6, 1945 |

FOREIGN PATENTS

| Number | Country | Date |
| --- | --- | --- |
| 452,573 | Great Britain | Aug. 25, 1936 |
| 462,639 | Great Britain | Mar. 12, 1937 |